United States Patent [19]

Jeong

[11] Patent Number: 5,931,697
[45] Date of Patent: Aug. 3, 1999

[54] DEVICE FOR CONNECTING A HARD DISK ASSEMBLY TO A PRINTED CIRCUIT BOARD

[75] Inventor: Woo-Cheol Jeong, Seoul, Rep. of Korea

[73] Assignee: SamSung Electronics Co., Ltd., Kyungki-do, Rep. of Korea

[21] Appl. No.: 08/877,476

[22] Filed: Jun. 17, 1997

[30] Foreign Application Priority Data

Jun. 18, 1996 [KR] Rep. of Korea ...................... 96-22055

[51] Int. Cl.$^6$ .................................................. H01R 13/74
[52] U.S. Cl. ........................................... 439/556; 439/559
[58] Field of Search .................................... 439/556, 557, 439/559; 174/65 RSS, 65 G, 152 G, 153 G

[56] References Cited

U.S. PATENT DOCUMENTS

| | | | |
|---|---|---|---|
| 3,753,212 | 8/1973 | Yamada et al. ..................... | 439/556 |
| 3,803,531 | 4/1974 | Sorensen ............................ | 439/559 |
| 4,080,522 | 3/1978 | Schimmels ......................... | 439/557 |
| 4,124,267 | 11/1978 | Mines et al. ........................ | 439/557 |
| 4,277,135 | 7/1981 | Schrott et al. ..................... | 439/556 |
| 4,896,231 | 1/1990 | Hoppe . | |
| 5,150,267 | 9/1992 | Reinisch . | |
| 5,337,202 | 8/1994 | Jabbarai et al. . | |
| 5,541,787 | 7/1996 | Jabbari et al. . | |
| 5,546,250 | 8/1996 | Diel . | |
| 5,582,411 | 12/1996 | Tyler . | |

FOREIGN PATENT DOCUMENTS

82/01296   12/1981   Japan ................................. 174/65 SS

*Primary Examiner*—Neil Abrams
*Assistant Examiner*—Jean F. Duverne
*Attorney, Agent, or Firm*—Robert E. Bushnell, Esq.

[57] ABSTRACT

A header connector device for making an electrical connection between a head stack assembly (HSA) mounted on the base frame of a hard disk drive and the main circuit board comprises a connector for connecting the head stack assembly with the main circuit board, a connector attachment opening formed in the base frame for attaching the connector, a flange provided on the periphery of the connector attachment opening so as to contact the side surfaces of the connector, a gasket mounted on the upper surface of the flange, and at least a pair of resilient hooks provided downwardly on the bottom of the connector near the periphery thereof to oppose each other, whereby the connector is inserted into the connector attachment opening so as to interpose the gasket between the connector and the flange and to cause the resilient hooks to be held by the bottom of the flange.

12 Claims, 4 Drawing Sheets

DEVICE FOR CONNECTING A HARD DISK ASSEMBLY TO A PRINTED CIRCUIT BOARD

CLAIM OF PRIORITY

This application makes reference to, incorporates the same herein, and claims all benefits accruing under 35 U.S.C. §119 arising from an application for a Head Connector Device For Making an Electrical Connection Between The Head Stack Assembly With The Main Circuit Board in a Hard Disk Drive earlier filed in the Korean Industrial Property Office on Jun. 18, 1996 and there duly assigned Ser. No. 22055/1996.

FIELD OF THE INVENTION

The present invention concerns a header connector device for making an electrical connection between the head stack assembly and the main circuit board in a hard disk drive.

BACKGROUND OF THE INVENTION

A hard disk drive is an auxiliary storage device widely used for computers which is made up of electronic and mechanical units, thereby converting digital signals into a magnetic field and vice versa to record and readout information to and from a magnetic medium. Such a hard disk drive is made up of a number of disks (magnetic media) for recording information thereon, electromagnetic heads for recording and reading out information to and from disks, a spindle motor for rotating disks, an actuator for moving read/write heads over disk surfaces to desired tracks, an electronic control circuit (PCBA), and an interface for linking the disk drive with a main computer.

Briefly describing the operation of a hard disk drive, when power is on, the spindle motor rotates to spin disks at constant speed, and the heads float above the surfaces of disks on an air cushion of uniform height, flying very close to the rotating disks. The heads move to the desired track automatically, whereby the disk drive transmits the ready condition signal through the interface to the host computer. When receiving read/write instructions from the host computer, the actuator turns on a pivot according to the positioning and speed control signals from the control circuit, whereby the read/write heads mounted on the fore-end of the actuator(arms) moves to the desired track on the disks and performs the reading and writing operations. At this time, the position and speed of the heads are continuously controlled by the control circuit during read/write operations.

As described above, in order that the read/write heads record and read out the information to and from the disks, the read/write heads should be electrically connected with a signal processing circuit on a PCBA (Printed Circuit Board Assembly). The connection between the read/write heads unit and the signal processing circuit is carried out by a header connector.

The data signals recorded to and read out from disks are transferred through a lead wire to the pre-amplifier within the flexible printed circuit (FPC) which is in turn connected with the signal processing circuit on the Printed circuit board assembly, wherein all the constituent elements from the read/write heads to the Flexible printed circuit are grouped into a structure by naming as "Head Stack Assembly (HSA)". In short, the above header connector links between the Head stack assembly and the above SPC (Signal Processing Circuit) on the Printed circuit board assembly.

U.S. Pat. No. 5,541,787 for a Head Disc Assembly With Printed Circuit Cable Connector Adapted For Automated Assembly and U.S. Pat. No. 5,337,202 for an Actuator Arm Assembly Printed Circuit Cable to External Printed Circuit Board Interface Apparatus to Jabbari et al disclose electronic connectors for disk drive assemblies that contain seals and gaskets about the electrical connector to prevent dirt from contaminating the disk drive assembly. In each of these patents, screws are also used to fasten the electrical connector to the disk drive assembly.

I have not seen an electrical connector for a disk drive assembly that is truly effective in preventing dirt from entering the chamber where the disk is located. Instead, screws are used which create dirt and foreign material that contaminates the cleanliness needed inside a disk drive assembly. What is needed is an electrical connector that contains gaskets and seals but does not rely on screws to fasten them to the assembly.

SUMMARY OF THE INVENTION

It is therefore an object to provide a header connector device for preventing a hard disk drive from being contaminated upon mounting the header connector device.

It is another object of the present invention to provide a header connector device to facilitate its mounting to a hard disk drive.

It is yet another object to provide an electrical connector for a hard disk drive assembly that contains gaskets to seal out contaminants.

It is still another object to provide an electrical connector for a hard disk drive assembly that does not contain screws to fasten the electrical connector to the disk drive assembly.

According to an embodiment of the present invention, a header connector device for making an electrical connection between a head stack assembly (HSA) mounted on the base frame of a hard disk drive and the main circuit board comprises a connector for connecting the Head stack assembly with the main circuit board, a connector attachment opening formed in the base frame for attaching the connector, a flange provided on the periphery of the connector attachment opening so as to contact the side surfaces of the connector, a gasket mounted on the upper surface of the flange, and at least a pair of resilient hooks provided downwardly on the bottom of the connector near the periphery thereof to oppose each other, whereby the connector is inserted into the connector attachment opening so as to interpose the gasket between the connector and the flange and to cause the resilient hooks to be held by the bottom of the flange.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
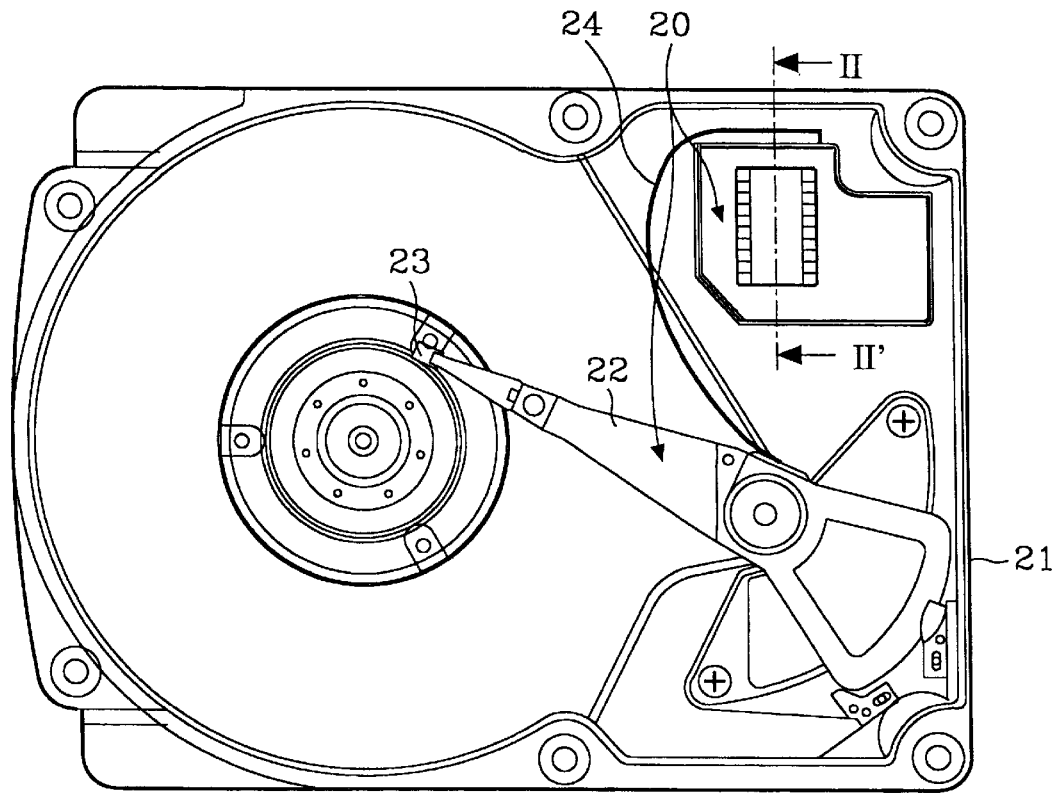
FIG. 1 is a top plan view illustrating the mounting state of the Head stack assembly of a conventional hard disk drive.
Figure 2:
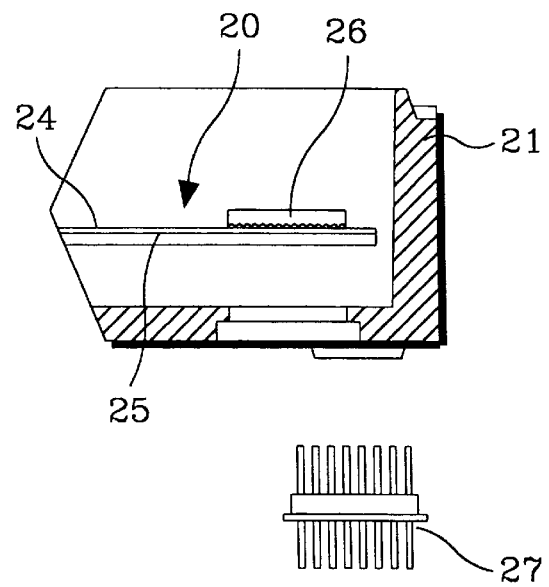
FIG. 2 is a sectional perspective view cut along "II—II" of FIG. 1 illustrating the mount construction of the header connector.

Referring to FIGS. 1 and 2, the head stack assembly 20 of the disk drive is installed on the top side of the base 21, thereby linking the read/write head 23 mounted on the tip of actuator 22 with the printed circuit board assembly (not shown) installed on the bottom surface of the base 21. The head stack assembly 20 has a flexible printed circuit 24 for transferring the data signals to and from the signal processing circuit on the printed circuit board assembly, and a substrate 25 for supporting and fixing the flexible printed circuit 24 to the base 21. The flexible printed circuit 24 is bonded onto the substrate 25. A socket connector 26 connected with the flexible printed circuit wire is soldered or bonded onto one side of the substrate 25 to be fixed thereon, and the portion of the base 21 on which the socket connector 26 is positioned is perforated. The substrate 25 is fixed onto the base 21 by means of screws, whereby the socket connector 26 of the substrate 25 fits into the perforated opening of the base 21.

A connector 27 having bidirectional pins is used in order to electrically connect the head stack assembly 20 with the printed circuit board assembly fixed on the underside of the base 21. The connector 27 is inserted through the perforated opening of the base 21 and is bonded to the base 21, or a sealing gasket is interposed between the connector 27 and the base 21, whereby the connector 27 is fastened to the base 21 by means of screws.

To describe in detail, the connector 27 is inserted into the perforated opening of the base 21 and bonded to be fixed therein, or fixed to the substrate 25 by means of welding, soldering or ultrasonic welding. On the contrary thereto, after the connector 27 is fixed to the printed circuit board assembly by means of welding, soldering or ultrasonic welding, both sides of the bidirectional pin connector 27 are inserted into the socket connector 26 of the substrate 25 and into the socket connector (not shown in drawings) of the printed circuit board assembly respectively, thereby transferring data signals between the read/write head and the signal processing circuit on the printed circuit board assembly bidirectionally. In another method for fixing the connector 27 in the perforated opening, a resilient gasket is interposed between the connector 27 and the base 21, whereby the connector 27 is fixed on the base 21 by means of screws. The above earlier method for bonding the connector 27 to the base 21 causes the outgassing while bonding, baking or curing, thereby contaminating the inside of disk drives and the clean rooms, resulting in corrosion of parts and elements and in stiction of read/write heads and disks. Furthermore, since the bonded parts should be dried under high temperature for a fairly long time (usually 30 minutes and more), the earlier method has the drawbacks that some separate drying fixtures and ovens are required to be additionally fabricated, resulting in the additional production cost, the production delay by additional drying time, and the deterioration of the reliability of products because of the defective bases 21 and other parts contaminated by outgassing from bonding materials while drying.

It is another disadvantage of the earlier screw fastening method for assembling the connectors 27 that the inside of disk drives and the clean rooms are contaminated by dust and foreign particles generated by the screw fastening operation, and since this screw fastening method uses usually two screws, the sealing efficiency of the gasket is deteriorated on portions remote from the two screws because of deformation of the gasket caused by the restoring force, resulting in defective contacts.

Figure 3:
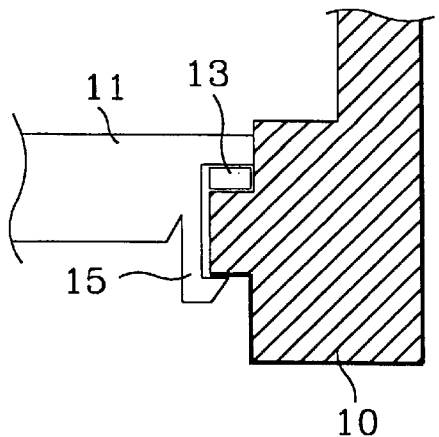
FIG. 3 is a sectional side view illustrating a mount construction of the header connector according to an embodiment of the present invention.

Referring to FIG. 3, in order to install the header connector 11 on the base 10 for electrically connecting head stack assembly (not shown) with printed circuit board or assembly, a connector, attachment opening is formed on one side of base 10, in which the connector 11 is placed, and the inside of the connector attachment opening, or counterbored hollow, of the base 10 is provided with a flange 14 on which connector 11 is seated, thereby interposing a gasket 13 between the rim located on the top side of connector 11 and flange 14. The combination of flange 14 and circumferential groove 12 is another way of describing the counterbored hollow with a circumferential groove located inside the hollow on a seating surface created by the counterboring. A pair of resilient hooks 15 are provided downwardly on the bottom of connector 11, whereby the resilient hooks, or latches, 15 are held and locked by the bottom edge of flange 14 when inserting the connector 11 into the connector attachment opening.

Figure 4:
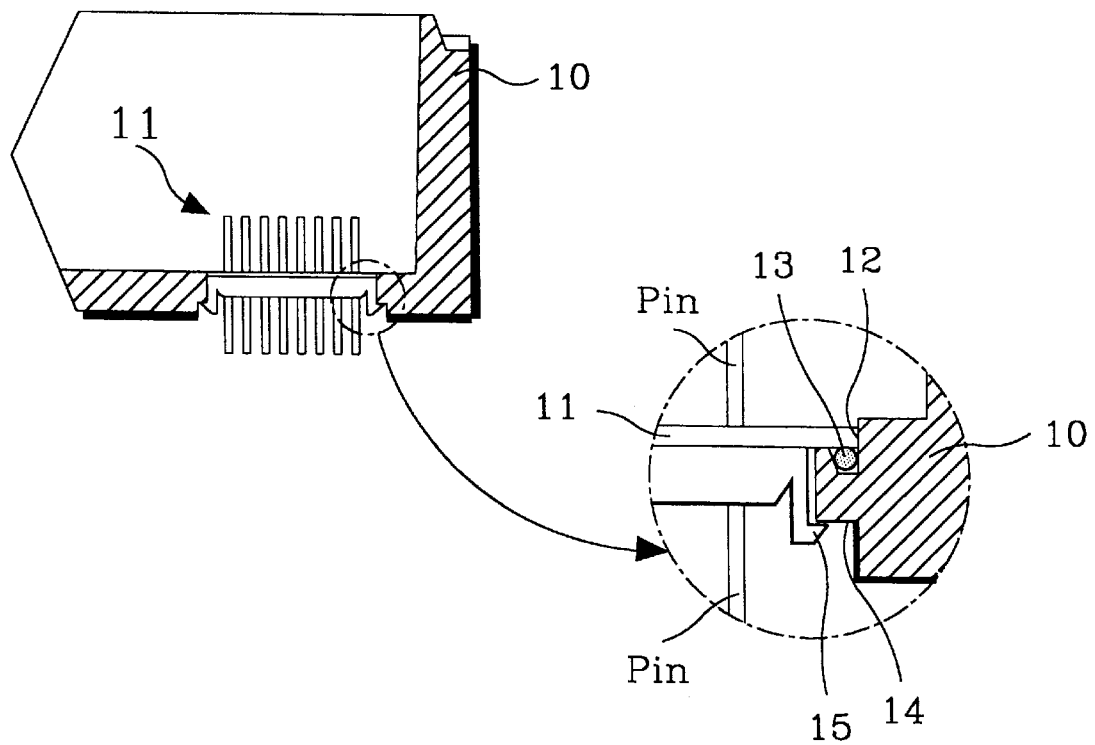
FIG. 4 is a sectional perspective view illustrating another mount construction of the header connector according to another embodiment of the present invention.

Referring to FIG. 4, in order to install the header connector 11 on the base 10 for electrically connecting head stack assembly (not shown) with printed circuit board assembly, a connector attachment opening is formed on one side of base 10, and a flange 14 is provided inwardly from the periphery of the connector attachment opening, whereby the connector 11 can be seated on the flange 14. A gasket fixing (mounting) groove 12 is formed on the flange 14, thereby sealing the connector attachment opening by interposing the gasket 13 between connector 11 and flange 14. At least a pair of resilient hooks 15 are provided downwardly on the bottom of connector 11, whereby the resilient hooks 15 are held and locked by the bottom edge of flange 14 when inserting the connector 11 into the connector attachment opening. The hooks 15 are made of resilient material to be locked up on the bottom edge of the flange 14 by the restoring force of the material, and the length of the hooks 15 is designed to properly compress the gasket 13.

Figure 5A:
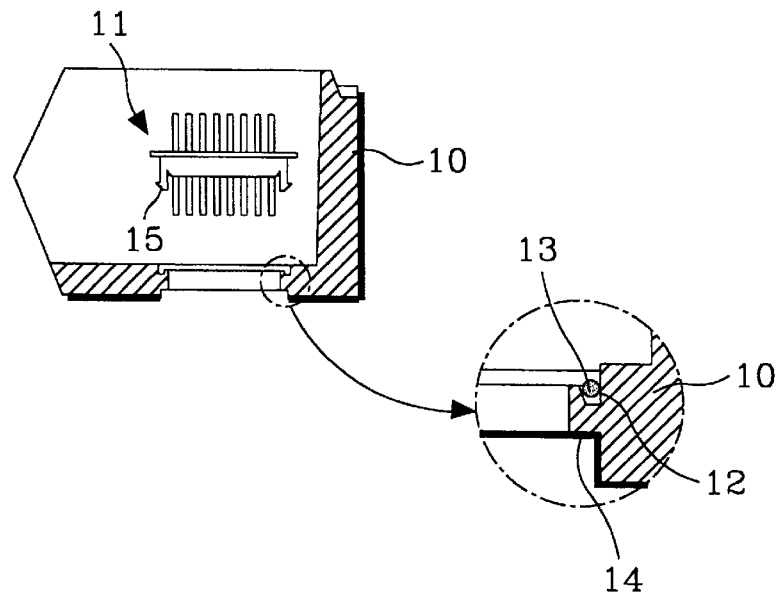
FIGS. 5A, 5B, and 5C are views illustrating the mounting procedure of the header connector according to the embodiment depicted in FIG. 4 of the present invention.
Figure 5B:
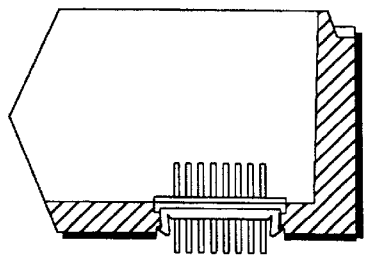
Figure 5C:
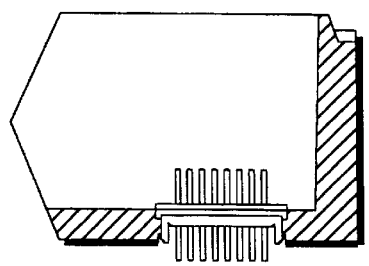

Referring to FIGS. 5A, 5B, and 5C, when mounting the connector 11 into the connector attachment opening, the gasket 13 is placed into groove 12 as shown in FIG. 5A, and then, the connector 11 is inserted into the connector attachment opening of base 10, whereby the resilient hooks 15 are pressed by the inside wall of the connector attachment opening as shown in FIG. 5B. When completely inserted, the depressed hooks 15 restore their normal shape due to the restoring force of the material, thereby being caught and locked by the bottom edge of the flange 14.

Figure 6:
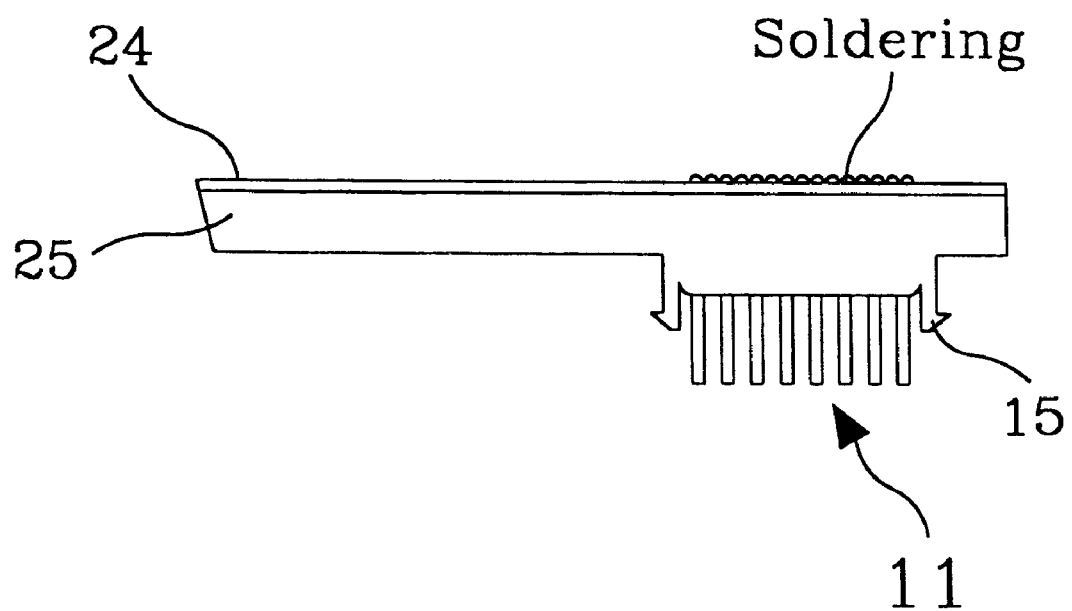
FIG. 6 is a side view illustrating the header connector according to the embodiment depicted in FIG. 4 of the present invention.

Referring to FIG. 6, the substrate 25 for supporting and fixing the flexible printed circuit 24 is formed integrally with the connector 11 having the resilient hooks 15, and the pins of one end of connector 11 are connected to the lead wires of the flexible printed circuit 24 by soldering. Such an integrated connector 11 with substrate 25 can be assembled into the base 10 as described above.

As mentioned above, the present invention has the advantages that the material cost and the assembling time are considerably reduced because any additional bonding apparatus as well as any bonding material and screws for assembly operation are not required, and the reliability of products can be improved by eliminating the contamination of constituent parts and elements by outgassing from bonding materials while drying. It is further an advantage that the header connector is made integrally with the flexible printed circuit substrate, and the connecting pins of the header connector are soldered to the flexible printed circuit substrate, thereby eliminating socket connectors so that the material cost and the process time are greatly reduced.

What is claimed is:

1. A disk drive, comprising:

a housing enclosing a disk drive assembly and having a base, said housing comprising:
  said base bearing a counterbored hollow; and
  an inner surface of said counterbored hollow having a circumferential groove;

a gasket mounted in said circumferential groove;

a bidirectional connector engaged with said housing and free of fasteners, said bi-directional connector having both a bottom side and a top side, said bi-directional connector comprising:
  a plurality of latches extending from said bottom side; and
  a rim formed on said top side;

said bi-directional connector being inserted into said counterbored hollow in said inner surface of said housing while said bottom side of said bi-directional connector penetrates said inner surface of said housing, said rim of said bi-directional connector compressing said gasket and said latches engaging said outer surface of said housing to fix said bi-directional connector inside said counterbored hollow while maintaining the compression of said gasket.

2. The disk drive of claim 1, further comprising said bottom side of said bi-directional connector engaging a printed circuit board.

3. The disk drive of claim 2, further comprised of said top side of said bi-directional connector engaging said disk drive assembly.

4. The disk drive of claim 3, further comprised of said latches having a predetermined length allowing said bi-directional connector to be firmly held in said counterbored hollow in said housing while maintaining compression of said gasket.

5. A disk drive, comprising:

a housing enclosing a disk drive assembly and having a base, said housing comprising:
said base bearing a counterbored hollow; and
  an inner surface of said counterbored hollow having a circumferential groove;

a gasket mounted in said circumferential groove;

a bi-directional connector engaged with said housing and free of fasteners, said bi-directional connector having both a bottom side and a top side, said bi-directional connector comprising:
  a body;
  a plurality of latches extending from said body and each being flush with a lateral side of said body; and
  a rim formed on said top side;

said bi-directional connector being inserted into said counterbored hollow in said inner surface of said housing while said bottom side of said bi-directional connector penetrates said inner surface of said housing, said rim of said bi-directional connector compressing said gasket and said latches engaging said outer surface of said housing to fix said bi-directional connector inside said counterbored hollow while maintaining the compression of said gasket.

6. The disk drive of claim 5, further comprising said bottom side of said bi-directional connector engaging a printed circuit board.

7. The disk drive of claim 6, further comprised of said top side of said bi-directional connector engaging said disk drive assembly.

8. The disk drive of claim 7, further comprised of said latches having a predetermined length allowing said bi-directional connector to be firmly held in said counterbored hollow in said housing while maintaining compression of said gasket.

9. The disk drive of claim 5, further comprised of said bi-directional connector having said latches constructed using an elastic material.

10. A disk drive, comprising:

a housing enclosing a disk drive assembly and having a base, said housing comprising:
  said base bearing a counterbored hollow; and
  an inner surface of said counterbored hollow having a circumferential groove;

a gasket mounted in said circumferential groove;

a substrate mountable in said housing and bearing a flexible printed circuit on one side and a connector on a second side;

said connector engaged with said housing and free of fasteners, said connector having a bottom side protruding from said second side of said substrate and comprising:
  a body;
  a plurality of latches extending from said body and each being flush with a lateral side of said body; and
  a rim formed by said substrate around said connector;

said connector being inserted into said counterbored hollow in said inner surface of said housing while said bottom side of said connector penetrates said inner surface of said housing, said rim of said connector compressing said gasket and said latches engaging said outer surface of said housing to fix said connector inside said counterbored hollow while maintaining the compression of said gasket.

11. The disk drive of claim 10, further comprising said bottom side of said bi-directional connector engaging a printed circuit board.

12. The disk drive of claim 10, further comprised of said latches having a predetermined length allowing said bi-directional connector to be firmly held in said counterbored hollow in said housing while maintaining compression of said gasket.

* * * * *